SOLID STATE A.-C. CONTACT UTILIZING
SILICON CONTROLLED RECTIFIERS

Filed Dec. 18, 1963

INVENTOR.
RICHARD L. WHITE
BY Mc Laughlin & Cahill
ATTORNEYS

United States Patent Office 3,287,571 Patented Nov. 22, 1966

3,287,571

SOLID STATE A.-C. CONTACT UTILIZING SILICON CONTROLLED RECTIFIERS

Richard L. White, Glendora, Calif., assignor to Dickson Electronics Corporation

Filed Dec. 18, 1963, Ser. No. 331,597
8 Claims. (Cl. 307—88.5)

The present invention pertains to A.-C. contacts, and more specifically, to solid state devices for replacing mechanical or electro-mechanical contacts in an A.-C. system.

Modern technology has required reliability and dependability in all phases of electrical circuitry. One particular area that is usually troublesome to electrical and electronic systems is the use of electrical A.-C. contacts. Mechanical and electro-mechanical systems for opening and closing a current-carrying circuit suffer from the difficulties inherent in mechanical design. The contacts themselves have a definite life span beyond which they are no longer dependable; further, the physical space required as well as the mass that must be moved militate against the use of mechanical contacts for many applications. Radio frequency interference and make-and-break time are also troublesome areas of prior art A.-C. contacts.

Accordingly, it is an object of the present invention to provide an A.-C. contact utilizing solid state devices.

It is also an object of the present invention to provide an A.-C. contact having a maximum break time of one-half cycle of the applied A.-C. voltage.

It is also an object of the present invention to provide an A.-C. contact that utilizes no moving parts, thus alleviating contact wear problems and yielding an A.-C. contact having practically no limit to the number of cycles of operation.

It is still another object of the present invention to provide a solid state A.-C. contact that may readily be constructed using compact low volume packaging techniques.

It is yet another object of the present invention to provide an A.-C. contact that does not have the disadvantage of radio frequency interference inherently caused by physically dislocatable contacts.

Further objects and advantages of the present invention will become apparent to those skilled in the art as the description thereof proceeds.

Briefly, in accordance with one embodiment of the invention, a pair of controlled rectifiers are provided and are oppositely polled to admit current, when gated, in opposite directions. The anode of the first rectifier and the cathode of the second rectifier are connected to one terminal of an A.-C. circuit. The cathode of the first rectifier and the anode of the second rectifier are connected to the second terminal of an A.-C. circuit. The gate electrodes of the two controlled rectifiers are connected in a series circuit including a capacitor for alternately gating the controlled rectifiers so that each conducts for a corresponding one-half cycle.

The present invention may more readily be described by reference to the accompanying drawings in which.

Figure 1:
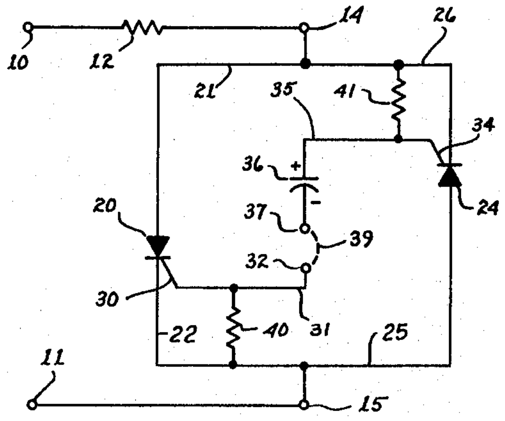
FIG. 1 is a circuit diagram of an A.-C. contact constructed in accordance with the teachings of the present invention.

Referring to FIG. 1, the A.-C. system in which the present invention is to be utilized includes a pair of contacts 10 and 11 connected to an appropriate source of alternating voltage (not shown). A load 12, shown in FIG. 1 as a simple resistance, is connected in series with terminals 14 and 15. Between the terminals 14 and 15, the A.-C. contact of the present invention is placed to open and close the circuit to the load 12.

The contact of FIG. 1 includes a first translating means such as controlled rectifier 20 having its anode connected to the terminal 14 through conductor 21, and its cathode connected to the terminal 15 through conductor 22. A similar translating means or controlled rectifier 24 is provided with its anode connected to the terminal 15 through conductor 25 and its cathode connected to the terminal 14 through conductor 26. Both of the controlled rectifiers 20 and 24 are conventional PNPN junction devices that readily carry current, when gated, in one direction, but block current in the opposite direction. Each of the controlled rectifiers, which may be categorized broadly as a translating device, including control elements or gating electrodes for switching the corresponding rectifier from a high impedance to a low impedance state. Information concerning control rectifiers may be obtained from many sources, one such source being the General Electric Control Rectifier Manual available from the General Electric Company, Auburn, New York.

Referring again to FIG. 1, control element 30 of control rectifier 20 is connected through a conductor 31 to a terminal 32. Similarly, control element 34 of the controlled rectifier 24 is connected through a conductor 35 to one side of a capacitor 36. The opposite side of the capacitor 36 is connected to a terminal 37. Terminals 32 and 37 may be left in the open circuit state or closed by shorting, as schematically illustrated in FIG. 1 by the dashed line 39. Resistances 40 and 41 may be connected between the corresponding control elements and cathodes of the controlled rectifiers to facilitate charging of capacitor 36 as will be described more fully hereinafter. However, the resistances 40 and 41 are usually not necessary since the conventional controlled rectifier available on the market has sufficiently low internal resistance between control element and cathode that the resistances 40 and 41 may not be necessary. The A.-C. contact thus provided between terminals 14 and 15 comprises reliable electronic components with no moving parts and which may readily be packaged into a small volume for insertion in the A.-C. system with the advantages set forth previously.

Figure 2:
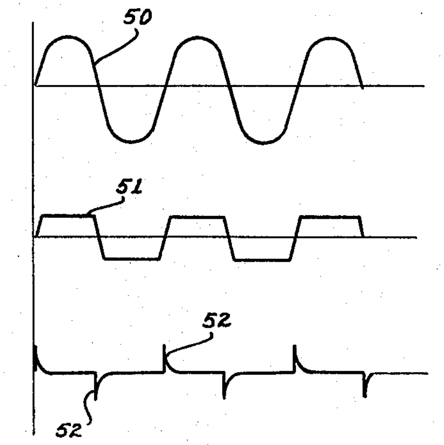
FIG. 2 shows representative waveforms useful for describing the operation of the circuit of FIG. 1.

The operation of the circuit of FIG. 1 may more readily be described by reference to the waveforms of FIG. 2. The A.-C. voltage present and applied to terminals 10 and 11 is represented by the waveform 50. The alternating voltage is substantially sinusoidal, thus rendering terminal 14 alternately negative and positive with reference to terminal 15. As terminal 14 becomes positive with respect to terminal 15, the voltage existing between terminals 14 and 15 will increase until equal to the forward voltage drop of controlled rectifier 20. Thus, an inspection of the waveform 51 illustrates that the voltage across the terminals 14 and 15 will rise to the point required to overcome the voltage drop existing across the controlled rectifier 20 and then will remain constant until the applied voltage once again approaches zero. It may be noted here that the waveforms of FIG. 2 are not drawn to scale since, normally, the applied A.-C. voltage to the system of FIG. 1 will greatly exceed the forward voltage drop exhibited by the controlled rectifiers of the A.-C. contact. The waveforms of FIG. 2 are merely illustrative and are intended to aid in the description of the operation and should not quantitatively be construed. During the next half-cycle of the applied voltage, terminal 15 becomes relatively positive with respect to terminal 14; accordingly, the voltage across the terminals will rise until the forward voltage drop of controlled rectifier 24 is attained and will then remain constant until the applied A.-C. voltage once again approaches zero.

To describe the operation of the control circuit including capacitor 36, it will be convenient to assume that the voltage applied to terminals 10 and 11 is presently of such polarity that terminal 14 is more positive than terminal 15, and that current is flowing through conductors 21 and 22 through the controlled rectifier 20. The capacitor 36 will thus be subjected to a charging current from terminal 14 through resistors 41 and 40 to terminal 15 (assuming that terminals 32 and 37 are shorted). The capacitor will accumulate a charge having a polarity indicated by the positive and negative signs adjacent the capacitor in FIG. 1. As the applied A.-C. voltage swings toward the zero voltage point, the voltage between points 14 and 15 will instantaneously change polarity, thus causing the charge accumulated on the capacitor 36 to provide a current pulse to the parallel circuit comprising resistor 41 and the control element 34 cathode circuit through the controlled rectifier 24. Since the latter leg of the parallel circuit is a very low resistance junction, the current pulse provided by the capacitor 36 will pass into the controlled rectifier 24 to gate the controlled rectifier to its conducting state. Thus, as the terminal 15 becomes more positive than terminal 14, current will readily be conducted from the terminal 15, through conductor 25, controlled rectifier 24, conductor 26 to terminal 14. The current pulse provided by the capacitor discharge is shown in FIG. 2 as a spike 52 generated at the voltage crossover point of the applied A.-C. voltage. Since the current provided by the capacitor 36 is proportional to the time rate of change of the applied voltage, and since the applied voltage rapidly changes from positive to negative, the current pulse provided is sufficient to gate the controlled rectifier.

When controlled rectifier 24 is conducting, the capacitor 36 accumulates a charge having a polarity opposite to that illustrated by the positive and negative sign in FIG. 1, and will subsequently discharge through the control element of controlled rectifier 20 to cause the latter to be gated to its conducting state when the applied voltage once again passes through the zero voltage point. The contact provided between terminals 14 and 15 of FIG. 1 will thus conduct alternating current with only the forward conducting voltage drop existing across the contact. Since the forward drop will generally be very small compared to the drop across the load 12, the A.-C. contact of FIG. 1, in its conducting state, provides a closed contact for the A.-C. system. When it is desired to interrupt the current to the load 12, the short between terminals 32 and 37 is removed thus interrupting the charge path of the capacitor 36. Thefore, the capacitor will fail to charge, and when the applied A.-C. voltage changes polarity and passes through a zero voltage point, the conducting controlled rectifier will be cut off, and the non-conducting controlled rectifier, since it will not receiving a gating pulse, will remain cut off. The circuit will thus be open and will not be closed again until one of the control rectifiers is gated on. It may thus be seen that a series A.-C. contacts may be provided wherein the only circuit to be interrupted is a capacitor charging circuit and not a load current carrying circuit. The problems caused by interrupting large currents are alleviated by the present invention since the load current is not "interrupted," and the load circuit is opened as the voltage reaches zero at the end of the half cycle.

Figure 3:
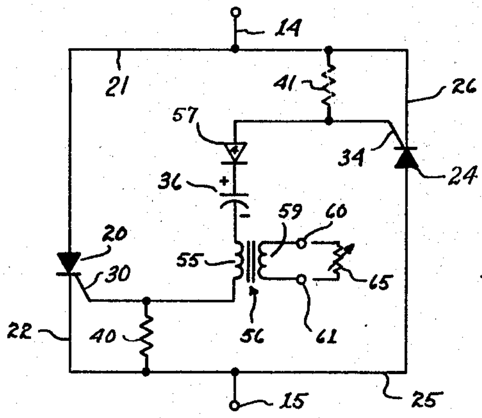
FIG. 3 is a modification of the circuit of FIG. 1.

Referring to FIG. 3, the A.-C. contact shown therein is a modification of that shown in FIG. 1 and utilizes similar circuit elements. The elements of FIG. 3 that are similar to those of FIG. 1 are designated by like numerals. The terminals 14 and 15 of the A.-C. contact are placed in series in the load circuit of an A.-C. system.

Figure 6:
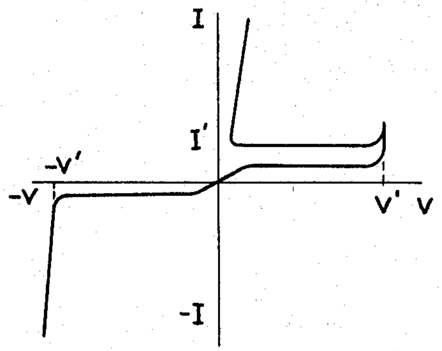
FIG. 6 represents the characteristic waveform of a four layer device.

The connections to the controlled rectifiers 20 and 24 is similar to those of FIG. 1. The circuit connecting the control elements 30 and 34 of the A.-C. contact of FIG. 3, however, includes the secondary winding 55 of a transformer 56, and a four layer semiconductor device 57. The four layer semiconductor device 57, commonly referred to simply as a "four layer," device is constructed in a manner similar to a controlled rectifier with the exception that no control or gate element is provided. The operation of the device is thus similar to a controlled rectifier with no gate current. A typical characteristic of a four layer device is shown in FIG. 6 wherein it may be seen that the forward characteristic (positive voltages applied) acts as a very high impedance until a forward breakover voltage V′ is reached at which time the four layer switches to a low impedance state. After switching to a low impedance state, the four layer characteristic becomes the same as a forward biased semiconductor diode, and will remain in the low impedance state as long as the current flowing through the device is maintained above the holding current I′. In the reverse biased condition (negative voltage applied) the four layer device acts in a similar manner to a zener diode in that the device remains in a high impedance state until a breakdown voltage (—V′) is reached, at which time the incremental impedance approaches zero.

Returning to FIG. 3, the primary winding 59 of the transformer 56 is connected to a pair of terminals 60 and 61. A variable impedance device, such as a variable resistor 65 may be connected across the terminals 60 and 61 to alter the impedance of the circuit including the primary of the transformer.

Figure 4:
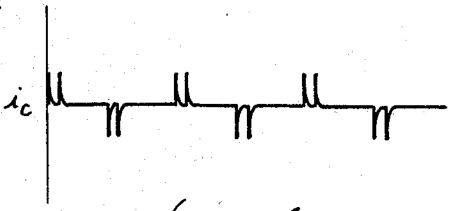
FIG. 4 represents a waveform useful for describing the operation of the circuit of FIG. 3.

The operation of the circuit of FIG. 3 may be described as follows. Assume that the A.-C. voltage of the system is such that the instaneous value of the voltage occurring across the solid slate A.-C. contact of FIG. 3 renders terminal 14 positive relative to terminal 15. Assume further that controlled rectifier 20 is in its conducting state and that the series circuit comprising transformer secondary 55, capacitor 36, and four layer device 57 has impressed thereon a voltage in a manner similar to the voltage impressed on the capacitor 36 of FIG. 1. The charge accumulated by the capacitor 36 will thus assume a polarity indicated by the positive and negative signs adjacent the capacitor in FIG. 3. As the voltage existing across terminals 14 and 15 approaches zero and begins to change polarity, the voltage impressed across the four layer device 57 will rise (negatively) so that the four layer device 57 will now become back biased and block current until the reverse breakdown voltage is impressed thereacross. When the reverse breakdown voltage is reached, a surge of current will be supplied to the control element 34 of the controlled rectifier 24; however, the voltage across the four layer device 57 will immediately drop so that it will again block conduction until the voltage is once again increased (negatively) to the reverse breakdown voltage. Since terminal 14 is now negative-going, the reverse breakdown voltage of the four layer device 57 is once again attained and another surge of current is provided to the control element 34 if the controlled rectifier 24 has not already been gated by the first pulse. The multiple spikes of current provided by the oscillating or jogging current surges in the series circuit of FIG. 3 are illustrated by the waveform of FIG. 4. The controlled rectifier 24 is thus gated on and the operation reverses in the next half cycle. When the polarity of the voltage applied to terminals 14 and 15 reverses, the charge accumulated by the capacitor 36 will attempt to provide a current surge to the control element 30 of the controlled rectifier 20. The four layer device is now forward biased and will not conduct in the forward direction until the forward breakover voltage is reached at which time a surge of current is provided by the control circuit to the control element 30. The voltage across the four layer device 57 then drops below that required to maintain the holding current and the four layer device 57 once again blocks current. As the voltage impressed on the control circuit continues to change, the forward breakover voltage is once again reached and another surge of current is provided to the gate or control element 30. Obviously, the forward breakover and reverse breakdown voltages of the four layer device must be chosen so that the voltages encountered by the four layer device in the circuit of FIG. 3 will sufficiently exceed the breakdown or breakover voltages to provide proper operation of the circuit.

The operation of the circuit of FIG. 3 has thus far ignored the existence of the transformer 56. The transformer 56 may be utilized to alter the impedance in the series circuit between the control elements of the controlled rectifiers. In the circuit of FIG. 1, the terminals 32 and 37 were either open circuited or short circuited depending upon the desired open or closed condition of the A.C. contact. In the circuit of FIG. 3, the impedance provided by the transformer 56 may be changed to provide the open or closed condition of the A.-C. contact without the necessity of opening or closing the control circuit between the control elements of the controlled rectifiers. When the impedance of the control circuit including the primary winding 59 of the transformer 56 is low, the impedance reflected into the control circuit through the secondary winding 55 will be sufficiently low to enable the A.-C. contact to operate as described; however, when a high impedance is inserted in the circuit of the transformer primary, the high impedance is reflected into the transforming secondary and thus inserted in the control circuit including the capacitor 36. The high impedance, in combination with the four layer device 57, prevents current pulses from being generated in the control circuit and from being applied to the appropriate control element. The high impedance reflected into the secondary winding of the transformer limits the current of the pulses to less than that necessary to gate the corresponding controlled rectifier. Thus, when the variable impedance 65 is connected to the terminals 60 and 61, and is adjusted for a low value of impedance, the A.-C. contact of FIG. 3 will operate to provide a low voltage drop closed circuit to the load connected in series with the contact. When the impedance 65 is adjusted to a high value, the correspondingly reflected high value of impedance in the secondary winding 55 will limit the magnitude of the current pulses in the control circuit between the control elements, and the A.-C. contact will thus "open" and will block further current after the applied voltage reaches zero in the present half cycle. The terminals 60 and 61 may be utilized to connect a remotely controlled impedance varying element so that the A.-C. contact of FIG. 3 may be controlled remotely and electronically.

Figure 5:
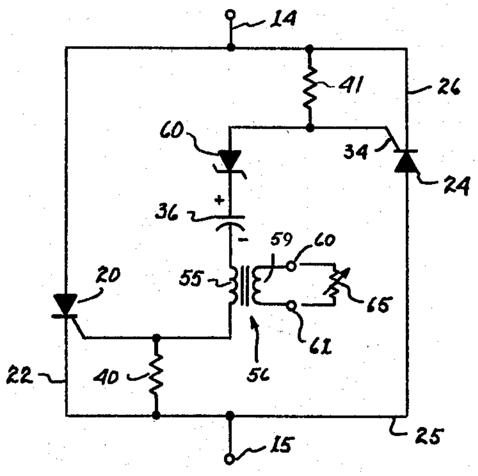
FIG. 5 is a further modification of the circuit of FIG. 1.

Referring to FIG. 5, a modification of the circuit of FIG. 3 is shown wherein a zener diode 60 is utilized in place of the four layer device used in the FIG. 3 embodiment of the invention. The remainder of the elements of FIG. 5 are identical to those of FIG. 3 and are correspondingly numbered. The operation of the circuit of FIG. 5 is similar to that of FIG. 3 in that the charge accumulated across the capacitor 36 will attempt to provide a current surge to the appropriate control element when the voltage impressed across the terminals 14 and 15 passes through zero. The zener diode will block a current surge in the reverse direction until the reverse breakdown voltage is reached, at which time a current pulse will be provided to the appropriate controlled rectifier. In the opposite direction, the charge remaining on the capacitor 36 caused by the necessity of overcoming the zener voltage will prevent a current pulse from occurring until the zener voltage is overcome even though the zener diode will actually conduct in the forward direction. The secondary winding 55 of the transformer 56 is inserted in series with the zener diode 60 and capacitor 36 to provide a means for inserting an impedance in the control circuit to limit the magnitude of the current pulses in a manner identical to that described in connection with FIG. 3.

The utilization of a transformer in the circuits of FIGS. 3 and 5 permits the insertion of a variable impedance into the control circuit between the corresponding control elements by means of either electronic or manual devices which may be remotely located to the A.-C. contact. The four layer 57 of FIG. 3 and the zener diode 60 of FIG. 5 illustrate two such devices that may be inserted in the A.-C contact of the present invention; it will be apparent to those skilled in the art that other devices may be used provided the characteristics of the respective devices are suitable non-linear. It will therefore be obvious to those skilled in the art that many modifications may be made of the circuits described in connection with the embodiments chosen for illustration without departing from the spirit and scope of the present invention.

I claim:

1. A solid state A.-C. contact comprising:
(*a*) a first and a second input terminal,
(*b*) a first translating means having a first element comprising an anode, a second element comprising a cathode, and a control element,
(*c*) a second translating means having a first element comprising a cathode, a second element comprising an anode, and a control element,
(*d*) means connecting the anode of said first translating means and the cathode of the second translating means to said first input terminal,
(*e*) means connecting the cathode of said first translating means and the anode of said second translating means to said second input terminal,
(*f*) a control circuit including a capacitor connected between the control element of said first translating means and the control element of said second translating means, said capacitor also being series connected to said first and second input terminals
(*g*) and means for opening and closing said control circuit including of said capacitor.

2. A solid state A.-C. contact comprising:
(*a*) a first and a second input terminal,
(*b*) a first translating means having a first element, a second element, and a control element,
(*c*) a second translating means having a first element, a second element, and a control element,
(*d*) means connecting the first element of said first translating means and the second element of the second translating means to said first input terminal,
(*e*) means connecting the second element of said first translating means and the first element of said second translating means to said second input terminal,
(*f*) a control circuit connected between the control element of said first translating means and the control element of said second translating means comprising
(1) a capacitor,
(2) a four layer semiconductor device,
(3) a variable impedance.

3. A solid state A.-C. contact comprising:
(*a*) a first and a second input terminal,
(*b*) a first controlled rectifier having a first element, a second element, and a control element,
(*c*) a second controlled rectifier having a first element, a second element, and a control element,
(*d*) means connecting the first element of said first controlled rectifier and the second element of the second controlled rectifier to said first input terminal,
(*e*) means connecting the second element of said first controlled rectifier and the first element of said second controlled rectifier to said second input terminal, (f) a control circuit connected between the control element of said first controlled rectifier and the control element of said second controlled rectifier comprising (1) a capacitor, (2) a four layer semiconductor device, (3) a variable impedance.

4. A solid stateA.-C. contact comprising:

(a) a first and a second input terminal, (b) a first controlled rectifier having a first element, a second element, and a control element, (c) a second controlled rectifier having a first element, a second element, and a control element, (d) means connecting the first element of said first controlled rectifier and the second element of the second controlled rectifier to said first input terminal, (e) means connecting the second element of said first controlled rectifier and the first element of said second controlled rectifier to said second input terminal, (f) a control circuit connected between the control element of said first controlled rectifier and the control element of said second controlled rectifier comprising (1) a capacitor, (2) a zener diode, (3) a variable impedance.

5. A solid state A.-C. contact comprising:

(a) a first and a second input terminal, (b) a first controlled rectifier having a first element, a second element, and a control element, (c) a second controlled rectifier having a first element, a second element, and a control element, (d) means connecting the first element of said first controlled rectifier and the second element of the second controlled rectifier to said first input terminal, (e) means connecting the second element of said first controlled rectifier and the first element of said second controlled rectifier to said second input terminal, (f) a control circuit connected between the control element of said first controlled rectifier and the control element of said second controlled rectifier comprising (1) a capacitor, (2) a four layer semiconductor device, (3) the secondary winding of a transformer, (g) means connecting the primary winding of said transformer to a pair of control terminals.

6. A solid state A.-C. contact comprising:

(a) a first and a second input terminal, (b) a first translating means having a first element, a second element, and a control element, (c) a second translating means having a first element, a second element, and a control element, (d) means connecting the first element of said first translating means and the second element of the second translating means to said first input terminal, (e) means connecting the second element of said first translating means and the first element of said second translating means to said second input terminal;

(f) a control circuit connected between the control element of said first controlled rectifier and the control element of said second controlled rectifier comprising (1) a capacitor, (2) a four layer semiconductor device, (3) the secondary winding of a transformer, (g) means connecting the primary winding of said transformer to a pair of control terminals, (h) and a variable impedance means connected in series with said primary winding of said transformer.

7. A solid state A.-C. contact comprising:

(a) a first and a second input terminal, (b) a first translating means having a first element, a second element, and a control element, (c) a second translating means having a first element, a second element, and a control element, (d) means connecting the first element of said first translating means and the second element of the second translating means to said first input terminal, (e) means connecting the second element of said first translating means and the first element of said second translating means to said second input terminal, (f) a control circuit connected between the control element of said first controlled rectifier and the control element of said second controlled rectifier comprising (1) a capacitor, (2) a zener diode, (3) the secondary winding of a transformer, (g) means connecting the primary winding of said transformer to a pair of control terminals.

8. A solid state A.-C. contact comprising:

(a) a first and a second input terminal, (b) a first translating means having a first element, a second element, and a control element, (c) a second translating means having a first element, a second element, and a control element, (d) means connecting the first element of said first translating means and the second element of the second translating means to said first input terminal, (e) means connecting the second element of said first translating means and the first element of said second translating means to said second input terminal, (f) a control circuit connected between the control element of said first controlled rectifier and the control element of said second controlled rectifier comprising (1) a capacitor, (2) a zener diode, (3) the secondary winding of a transformer, (g) means connecting the primary winding of said transformer to a pair of control terminals, (h) and variable impedance means connected in series with said primary winding of said transformer.

References Cited by the Examiner

UNITED STATES PATENTS 3,184,670 5/1965 Reynolds ____________ 307—88.5

3,210,571 10/1965 Hutson ____________ 307—88.5

ARTHUR GAUSS, *Primary Examiner.*

J. T. BUSCH, *Assistant Examiner.*